F. G. EPPLEY.
BEARING.
APPLICATION FILED JUNE 18, 1913.
1,214,289.
Patented Jan. 30, 1917.
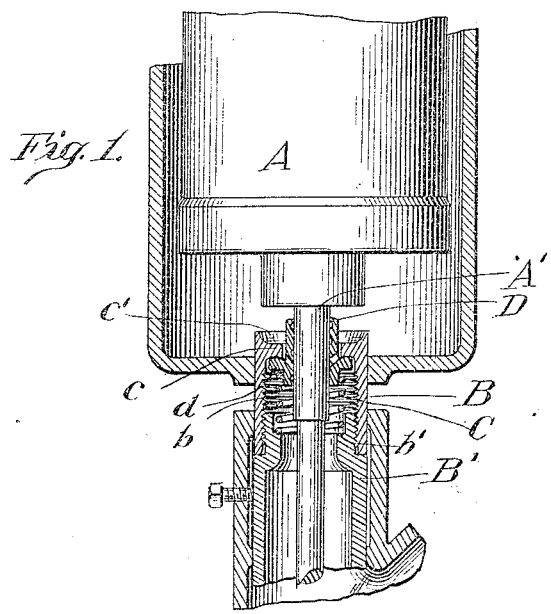
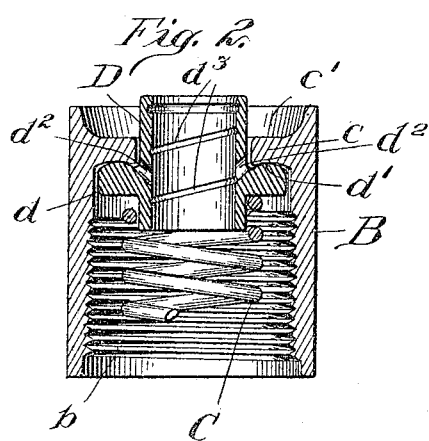
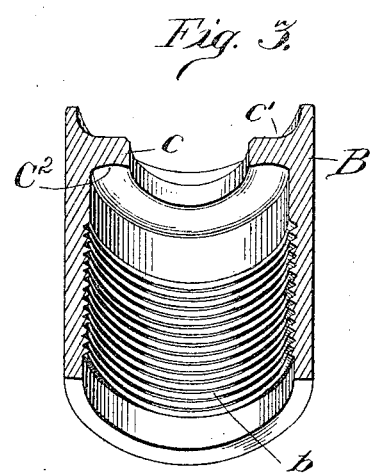
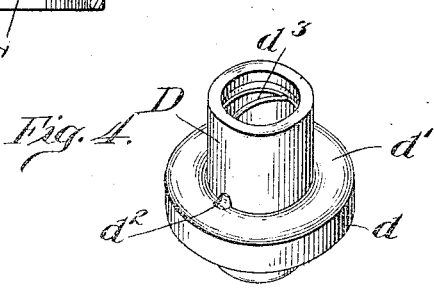
Witnesses:
Milton Lenoir
Wll Slrother
Inventor:
Francis G. Eppley.
Attorney.

UNITED STATES PATENT OFFICE.

FRANCIS G. EPPLEY, OF CHICAGO, ILLINOIS, ASSIGNOR TO ALBAUGH-DOVER CO., OF CHICAGO, ILLINOIS, A CORPORATION OF ILLINOIS.

BEARING.

1,214,289.  Specification of Letters Patent.  Patented Jan. 30, 1917.

Original application filed April 10, 1909, Serial No. 489,028. Divided and this application filed June 18, 1913. Serial No. 774,279.

*To all whom it may concern:*

Be it known that I, FRANCIS G. EPPLEY, a citizen of the United States, residing at Chicago, Cook county, Illinois, have invented certain new and useful Improvements in Bearings, of which the following, taken in connection with the drawing, is a description.

This invention relates to flexible bearings of the class shown and described in my application for Letters Patent on liquid separators, Serial No. 489,028, from which case this is a divisional application.

My invention has for its object the production of a flexible bearing, designed more particularly for use in centrifugal liquid separators and like apparatus where a revoluble part, such as the cream separator bowl is operated at a very high rate of speed. When the separator bowl is being rapidly revolved there is a tendency to a lateral motion, which ordinarily causes the revolving bowl to get out of balance. I overcome this objection in the operation of my device by means of my flexible bearing which practically prevents any such tendency to lateral motion by means hereinafter more specifically described.

In the accompanying drawings I have illustrated what I now consider the preferred form of my construction, and in these drawings—

Figure 1 is a vertical sectional view through the bearing supporting the spindle and separator bowl of a centrifugal separator; Fig. 2 is an enlarged vertical sectional detail of the bearing, showing the coiled spring in position; Fig. 3 is a sectional view of the bearing casing; Fig. 4 is a perspective view of the neck bearing.

Referring to Fig. 1 A represents the separator bowl of a centrifugal liquid separator, which is supported upon a spindle A', which in turn is mounted in a flexible bearing hereinafter described.

B is a cylindrical casing which is screw threaded $b$, upon the inside thereof. This casing B engages, by means of the threads, $b$, a support B', which is part of the frame of the machine. This support B' is cylindrical in shape and is provided at the upper end thereof with a shoulder $b'$, which forms a seat for the coiled spring C hereinafter explained.

D is the neck bearing through which the spindle A' extends. This bearing is provided near the bottom thereof with an exterior circumferential flange $d$, the top surface $d'$ of which is rounded or curved radially as shown.

$d^2, d^2,$ are openings extending through the wall of the neck bearing and upon the inside thereof having communication with a helical groove $d^3$ which extends from the bottom to the top of the neck bearing.

The bearing case B is provided near the upper end thereof with an internal circumferential flange $c$ which is dished to form an oil receptacle $c'$ upon the top, shown more clearly in Fig. 2. The under surface of this flange $c$ is slightly concave as shown more clearly at $c^2$, Fig. 3. When assembling this construction the neck bearing D is placed inside the casing with the upper convex face of the flange $d'$ abutting the under convex face of the flange $c$ of the casing. The coiled spring C seats against the under face of the flange $d$ and upon the shoulder $b'$. The spindle A' supporting the separator bowl A extends through the neck bearing D, spring C, and the supporting member B to the mechanism by which it is operated, which is not herein described.

The radius of the abutting faces of the two flanges $c\, d$ are of different sizes as shown more clearly in Fig. 2. It will be observed that the external diameter of the neck bearing is slightly smaller than the opening through the flange $c$ through which it extends.

The pressure of the spring C against the neck bearing D holds said bearing against the flange $c$. It will be observed that the meeting faces of these two flanges are unlike, the flange $c$ being wider than the flange $d'$. When the device is in operation the convex flange $d'$ seeks the center of the concave side of flange $c$ the effect of which is to keep the bowl in perfect alinement, regardless of the rate of speed at which the bowl is being revolved.

When the device is to be operated, any suitable lubricant is placed in the oil receptacle $c'$, which flows over the edge of the flange $c$ on flange $d$ where it gathers next to the neck of the bearing and passes through the openings $d^2, d^2$ to the inside thereof, and follows the helical groove $d^3$ to the top of the bearing, where it overflows into the receptacle c', and repeats the operation, thereby automatically keeping the bearing well lubricated at all times.

I claim:—

1. A bearing comprising a casing having an inwardly extending circumferential flange near the top thereof, a neck bearing extending through the opening surrounded by said flange, an outwardly extending flange surrounding said neck bearing and adapted to abut against the under side of the first named flange, the meeting faces of said flanges presenting concavo-convex surfaces to each other, said surfaces having unequal radii of curvature, and a spring exerting a pressure against the neck bearing flange, substantially as described.

2. In a bearing, the combination of a cylindrical casing, having an annular flange inside thereof, said flange having an uneven radial curvature upon the under face thereof, a neck bearing in said casing provided within a helical groove upon the inside thereof and with openings through the walls of said bearing, a flange surrounding said neck bearing, the meeting faces of the aforesaid flanges having unequal radii of curvature, and a spring seated within said casing and bearing against the neck bearing, substantially as described.

In testimony whereof I have signed this specification in the presence of two subscribing witnesses.

FRANCIS G. EPPLEY.

Witnesses:
GEORGE S. ALBAUGH,
A. R. FOLLETT.

Copies of this patent may be obtained for five cents each, by addressing the "Commissioner of Patents, Washington, D. C."